Aug. 14, 1951   R. A. SANDBERG ET AL   2,564,451
CUTTING TOOL
Filed Nov. 23, 1946
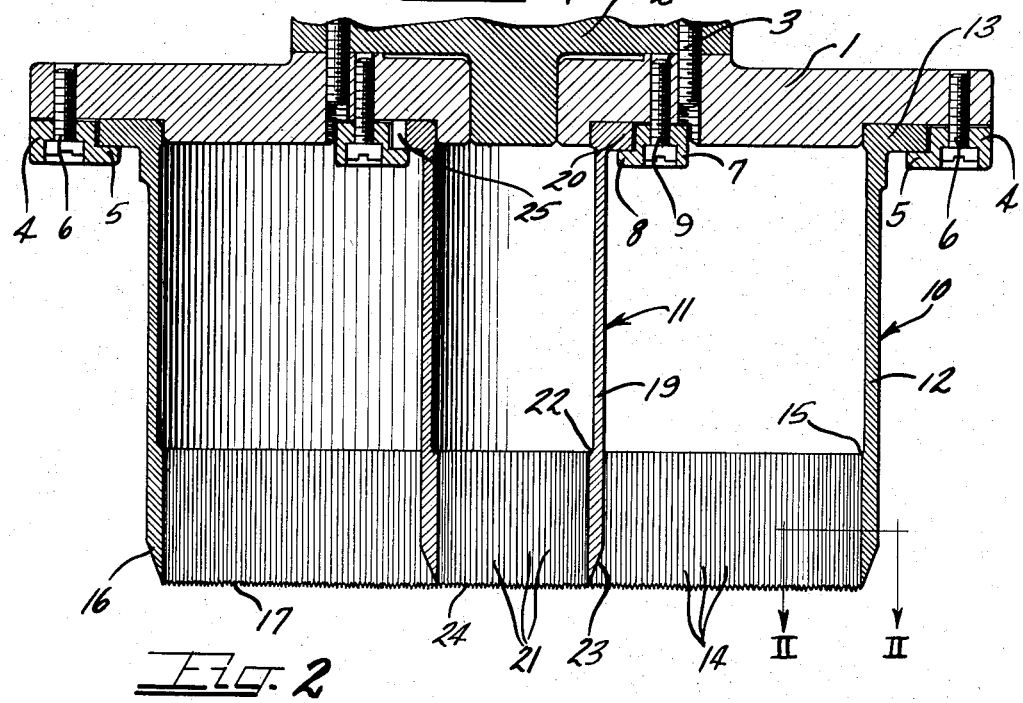
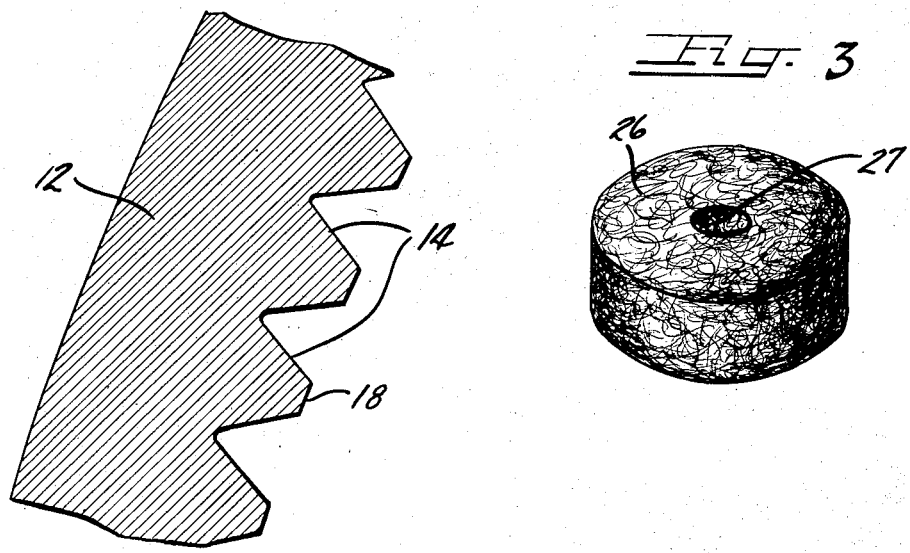
Inventor
RAY A. SANDBERG
ERNEST J. VAN SICKEL
by
Attys.

Patented Aug. 14, 1951

2,564,451

UNITED STATES PATENT OFFICE 2,564,451

CUTTING TOOL

Ray A. Sandberg and Ernest J. Van Sickel, Waukegan, Ill., assignors to Houdaille-Hershey Corporation, Detroit, Mich., a corporation of Michigan Application November 23, 1946, Serial No. 712,008

2 Claims. (Cl. 164—86)

1

This invention relates to improvements in a cutting tool, and more particularly to a power driven cutting tool of a type highly desirable for severing fibrous material, although the invention will have other uses and purposes as will be apparent to one skilled in the art.

In the past many and various power driven cutting tools have been developed, but in all instances of which we are aware these formerly known tools have not proven satisfactory for the accurate cutting of fibrous material, and especially for the cutting of a complete object from an intermediate part of a resilient fibrous mat or batt. In cutting an article from material of that character it is desirable to have the resultant article of the same original thickness as the batt, and to have the edges of the article satisfactorily smooth. Difficulty in acquiring such an article was amplified especially if the article desired had a circular or curvate contour. The difficulty was further exaggerated in the event the article required two separate locations of cut such as the provision of an aperture through the central portion of the article, it being preferable, of course, to make all necessary cuts or lines of cut in one operation. In addition, considerable difficulty has been experienced with cutting tools in the past by virtue of the fact that unless an extremely careful, tedious and expensive sharpening process was resorted to the tool soon lost its temper, became out of line, or otherwise was rendered unsatisfactory for future use after only a relatively short life. In some cases, the sharpening process was almost as expensive as the original cost of the tool. Even after sharpening, though it be done in an extremely careful manner, cutting tools heretofore known of the general type set forth herein were never as satisfactory as when originally made.

With the foregoing in mind, it is an important object of the instant invention to provide a cutting tool that is economical in construction and very economical to maintain in satisfactory working condition, and which is designed to cut a complete object from an intermediate location in a resilient fibrous batt.

Another object of this invention is the provision of an economical cutting tool shaped to sever a complete article requiring a plurality of cuts from an intermediate location of a resilient fibrous batt, the article being completely removed from the batt in one operation.

Another feature of this invention is the provision of a power driven cutting tool capable of severing an article having a curvate contour

2 from a mat or batt of relatively soft and yieldable material.

Still another object of this invention is the provision of a cutting tool capable of severing relatively soft and yieldable material, the cutting tool having a curvate contour and of a character that is very easily and economically sharpened and maintained.

It is also an object of this invention to provide a cutting tool having a serrated or saw toothed cutting edge, the tool being so constructed that said edge may be maintained in a sharp condition by a simple operation of the character commonly employed to sharpen a plain cutting edge.

It is also a feature of this invention to provide a cutting tool having a curvate contour and provided with a series of longitudinally extending grooves on the inner face, the outer face of the tool being beveled near the cutting edge, whereby the tool may be repeatedly sharpened merely by grinding down the bevel, and a serrated or saw tooth cutting edge will be maintained.

A further object of the invention is the provision of a compound cutting tool capable of making a plurality of cuts at the same time, employing an inner cutting member of the same character as an outer cutting member, both of which are readily separable for separate sharpening.

While some of the more salient features, characteristics and advantages of the instant invention have been above pointed out, others will become apparent from the following disclosures taken in conjunction with the accompanying drawing, in which Figure 1 is a fragmentary central vertical sectional view, parts being shown in elevation, of a cutting tool embodying principles of the instant invention, showing the same connected to a driving head;

Figure 2 is a fragmentary magnified transverse sectional view taken substantially as indicated on the line II—II of Fig. 1 looking in the direction of the arrows; and Figure 3 is projectional view of a finished article of the character that would be cut by the tool of Fig. 1.

As shown on the drawings:

The illustrated embodiment of the instant invention is shown in operative association with a driving mechanism including a disk-like driving head 1 removably connected to a rotatable support 2 by means of bolts 3 or the equivalent. The head 1 is provided with a removable holding ring 4 having an inwardly extending flange 5 and attached to the head by means of bolts 6 or the equivalent. In the central region thereof the head 1 is provided with a similar ring 7, similarly flanged as at 8, and removably connected with the head by means of bolts 9. The holding ring 4 is for the purpose of attaching an outer cutting member to the head 1, while the inner ring 7 may hold an inner cutting member.

With reference more particularly to Fig. 1, the holding rings are shown in an operative association, with the outer ring 4 supporting an outer cutting element generally indicated by numeral 10, while the inner ring 7 supports the inner cutting element generally indicated by numeral 11. In the illustrated showing, both cutting elements or members 10 and 11 are cylindrical in shape and each element makes a complete circular cut. The two cutting elements are substantially identical in construction, with the exception that one is smaller in size than the other.

The outer cutting element 10 embodies a metal cylinder 12, preferably of hardened steel. At the upper end this cylinder has an outwardly extending radial flange 13 for engagement by the flange 5 on the head 1 to hold the element in position on the head to be driven thereby. At the opposite or cutting end, the element is provided with numerous grooves 14 extending longitudinally of the element and on the inside face. One satisfactory number for such grooves is 20 per inch. These grooves may extend upwardly any desirable distance, as long as there is room between the termination of the grooves and the ring 7 to sever an article of desired thickness. The cutting element is obviously made longer than necessary at the outset so as to insure continued usage after a portion of the element is periodically cut away due to sharpening. For example, if it is desired to sever a device three inches in thickness, and the cutting element is five inches long, the grooves 14 may extend approximately two inches inside the element. Obviously the grooves could extend the entire distance inside the element but economy of production should limit those grooves to an extent consistent with the life of the element.

As seen in Fig. 1, the lower part of the element is preferably thickened at least to the extent of the depth of the grooves as indicated at 15, the thickening being preferably internal. Externally the element is beveled as at 16 to define a sharp cutting edge 17. Owing to the grooves 14, this cutting edge will be saw toothed or serrated.

As shown in the magnified illustration of Fig. 2, it is preferable that each flute defined by adjacent grooves terminate in a substantially straight outer edge as indicated at 18, rather than come to a definite line. When the bevel 16 is then provided, each tooth will have a straight and extremely sharp cutting edge as distinguished from a point, even though that cutting edge may be extremely short due to the number of the grooves. It will also be noted that the side walls of each tooth going to the bevel will also become sharpened so that the tooth does not cut only at its edge but also along its side wall as well.

The great advantage of providing the grooves 14 on the inner face of the cutting element resides in the fact that the element may be resharpened repeatedly with no attention being paid to the saw tooth edge or to the grooves. It is simply necessary to grind the bevel 16 whenever the element becomes dull, and the grinding of this bevel will automatically provide the desired serrated cutting edge and a very sharp serrated cutting edge. Consequently, no more effort is required in the sharpening of the instant device than is required to sharpen an ordinary smooth cutting edge.

A further advantage is found in the use of a serrated edge in that the cutting element will accurately sever a resilient fibrous batt, whereas a smooth cutting edge regardless of its sharpness will tend to compress the batt too greatly during the cutting operation, and as a result the cut is neither as accurate nor as clean as desired.

The cutting element 10 obviously will sever a substantially circular article from whatever is being cut. In the event it is desired to provide a central aperture in that article, the cutting element 11 is also used simultaneously with and in conjunction with the element 10. This element 11 comprises a cylinder 19 having a radial flange 20 engaged by the supporting ring 7. The element includes the grooves 21 in the lower portion, is thickened as at 22 to at least the depth of the grooves in the lower region, and is beveled as at 23 to provide a sharp serrated cutting edge 24. In short, the element 11 is of the same general construction as the element 10 but smaller in size. Each of the cutting elements is preferably provided with a notch in the circumferential portion of its respective anchoring flange 13 or 20 as indicated at 25 in Fig. 1 so that the respective elements may be anchored against rotation relative to its support for sharpening purposes. If deemed necessary, a suitable key may be utilized to anchor the element against rotation relative to the holding flange on the head 1, but that is usually unnecessary.

In Fig. 3 we have illustrated one specific example of an article that may be cut by the compound cutting element of Fig. 1. This specific example is in the form of a filter unit for automotive air cleaners. In the manufacture of such a unit vegetable fibers, such as sisal, animal hair, or some equivalent and satisfactory fibrous material is curled, crinkled, crimped, or otherwise undulated and separated into loose fibers which are joined together at points of contact by the application of a suitable plastic bonding agent. As a result a batt is formed which may be of any desirable length, thickness, or width. The width, of course, is usually just sufficient to permit the cutting of a certain number of filter elements or other devices transversely of the batt so as to avoid waste. The thickness of the batt depends upon the desired thickness of the resultant article. When completed, such a batt will be self-sustaining, highly resilient, and uniform in density. The batt may be compressed to a considerable extent and will return to its original size upon release of pressure. Consequently, such a batt is difficult to cut. The straight smooth cutting edge will compress the batt before severing the respective strands, and consequently when the cutter has passed through the batt the side or edge of the resultant article is ragged, and with a rapidly moving cutter, with much compression of the batt objectionable heat resulting from friction may cause injury both to the article as well as the cutting implement.

With the instant invention, however, it is a simple expedient to rotate the member 2, by any suitable drive means, and consequently rotate the head together with the cutting elements 10 and 11. With the serrated edge the fibers of the batt are sawed and are thus severed before undue compression results. Consequently, a smooth uniform article such as the filter element 26 is removed from the batt. This element has a circular contour, and if the cutting element 11 is used the central aperture 27 will be made in the filter element. By way of example and not by way of limitation, it may be mentioned that a speed of 1500 R. P. M. is satisfactory for the cutting operation upon a batt of the character just above described.

It will be understood that numerous other items may be cut by the instant invention. Further, it will be noted that the cutting tool is simple in construction, economical to manufacture, long-lived, and may be sharpened in an extremely easy manner with no particular attention paid to the serrated edge which will always remain by virtue of the internal grooves.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. In a high speed rotary cutting tool for evenly severing through a porous mat of fibrous material, a cylindrical member beveled inwardly on the outer face at the cutting end thereof, said member otherwise having a substantially uniform external diameter throughout the working length thereof, said member being at least as long as the piece to be severed, the inside face of said member being provided with longitudinally extending V-shaped grooves extending inwardly from the cutting edge, said grooves being spaced apart laterally the intersection of the external bevel with the grooves providing a serrated cutting edge of generally V-shaped teeth each tooth of which has a relatively short circumferentially extending sharp edge as distinguished from a point.

2. In a high speed rotary cutting tool for evenly severing through a porous mat of fibrous material, a cylindrical member beveled inwardly on the outer face at the cutting end thereof, said member otherwise having a substantially uniform external diameter throughout the working length thereof, said member being at least as long as the piece to be severed, the inside face of said member being provided with longitudinally extending V-shaped grooves extending inwardly from the cutting edge for a portion of the length of said member, the wall of said member being inwardly thickened in the region of said grooves, said grooves being spaced apart laterally, the intersection of the external bevel with the grooves providing a serrated cutting edge of generally V-shaped teeth each tooth of which has a relatively short circumferentially extending sharp edge as distinguished from a point.

RAY A. SANDBERG.
ERNEST J. VAN SICKEL.

REFERENCES CITED

The following references are of record in the file of this patent:

UNITED STATES PATENTS

| Number | Name | Date |
|---|---|---|
| 257,311 | Gallagher | May 2, 1882 |
| 1,894,999 | MacReady | Jan. 24, 1933 |
| 2,141,492 | Southwick | Dec. 27, 1938 |
| 2,346,220 | Kienzle et al. | Apr. 11, 1944 |
| 2,429,245 | Telles | Oct. 21, 1947 |

FOREIGN PATENTS

| Number | Country | Date |
|---|---|---|
| 777,245 | France | Nov. 26, 1934 |
| 377,303 | Great Britain | July 25, 1932 |